Jan. 15, 1924.

L. L. LADD

DUST COLLECTOR

Filed June 19, 1922

Inventor
Lester L. Ladd.
By: Jahul & Mueller Attys

Patented Jan. 15, 1924.

1,480,685

UNITED STATES PATENT OFFICE.

LESTER L. LADD, OF LOCKPORT, ILLINOIS.

DUST COLLECTOR.

Application filed June 19, 1922. Serial No. 569,195.

*To all whom it may concern:*

Be it known that I, LESTER L. LADD, a citizen of the United States, residing at Lockport, in the county of Will and State of Illinois, have invented a certain new and useful Improvement in Dust Collectors, of which the following is a full, clear, concise, and exact description, reference being had to the accompanying drawings, forming a part of this specification.

My invention relates to dust collectors, and more particularly to a dust collector which is of such a compact construction that the same can be applied to individual milling machines. My dust collecting mechanism operates on the principle that dust will collect on the inner face of a revolving member if the dust-laden air is passed by said face.

It is a purpose of the invention to provide a plurality of members which have inclined or conical inner faces, and which have slits provided between adjacent ones of said members for the purpose of collecting dust, said members all revolving about a common center. Said members are preferably mounted to revolve with a casing. Mounted to rotate with said dust collecting members is a plurality of scrapers which are adapted to engage with the inner surface of a stationary casing surrounding said rotating parts so as to scrape the dust that would collect on the inner face of said casing off the same.

Mounted within said rotating dust collecting members is an agitating device comprising a plurality of blades which rotate at a greater rate of speed than said dust collecting members, said agitating members being so shaped as to extend substantially parallel to the dust collecting surfaces of the revolving dust collecting members and only slightly clearing said surfaces so that if such an amount of dust collects on said surfaces as to reach to said blades, the same will be scraped therefrom by said agitating members or blades. The stationary drum or casing is preferably provided with a narrow slit through which the dust passes into a separate chamber which is so constructed that the air which passes out through the slit with the dust is returned to the dust collector and the dust passes out of the machine. By providing a plurality of openings or slits adjacent the inclined annular faces of the revolving rings or dust collecting members, the dust can be very effectively collected. Due to the inclined surfaces on the dust collecting members and the action of the blades within the same, the dust that is collected thereon will gradually travel outwardly on said surfaces until said dust passes through one of the slits between one of the revolving rings and an adjacent ring. As the dust laden air travels through the machine, a considerable quantity of the dust will be deposited on the first dust collecting ring, thus reducing the volume of the dust in the air and a smaller quantity of dust will be collected on each succeeding ring until the air has passed a sufficient number of other rings so that practically no dust will remain therein when the air passes out of the machine.

It is a purpose of the invention to provide a dust collector which will not readily be put out of commission by the dust clogging the spaces between the revolving rings, and it has been found that by providing a stationary drum around the revolving members with only a small opening therein for the dust to pass out, that the spacing between the rings can be made of such a size that the dust therein will not collect therebetween so as to clog said openings and yet only a small percentage of the air which passes into the dust collector would be returned thereto due to passing through said slit.

It is another purpose of the invention to so shape the chamber and the revolving parts carrying the agitating means that the dust is thrown toward the outer side of the chamber having the revolving outer wall portion so as to aid in the depositing of the dust on the inclined annular surfaces.

It is also preferred that the scrapers provided for loosening the dust from the stationary drum be so constructed that the same will act as spacing means for the annular dust collecting rings, the annular dust collecting rings preferably comprising an inclined or conical wall portion and a straight or disk-like wall portion and the scraper blades are preferably mounted between the disk-like or radial portions of the rings in such a manner to properly space the same. The first collector member having the inclined or conical inner face is preferably made such larger than the other collecting members, and is preferably made in the shape of a bell having a long inner inclined annular face. As a much larger volume of dust will collect on this face than on the relatively narrow faces of the collector rings, the opening between said bell and the first collector rings must be greater than the opening between the similar smaller collector rings.

It will be seen that by providing a large number of inclined annular surfaces upon which the dust can collect and from which it moves through openings into the space within the stationary drum, a much more compact device can be obtained than where the inclined surface is continuous. Also many more openings are provided through which the dust may pass. By providing the agitating means within the chamber it is unnecessary to limit the size of the opening at any particular place in order to obtain a desired amount of suction within the chamber, as would be the case where an exhaust fan is used.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

Figure 1:
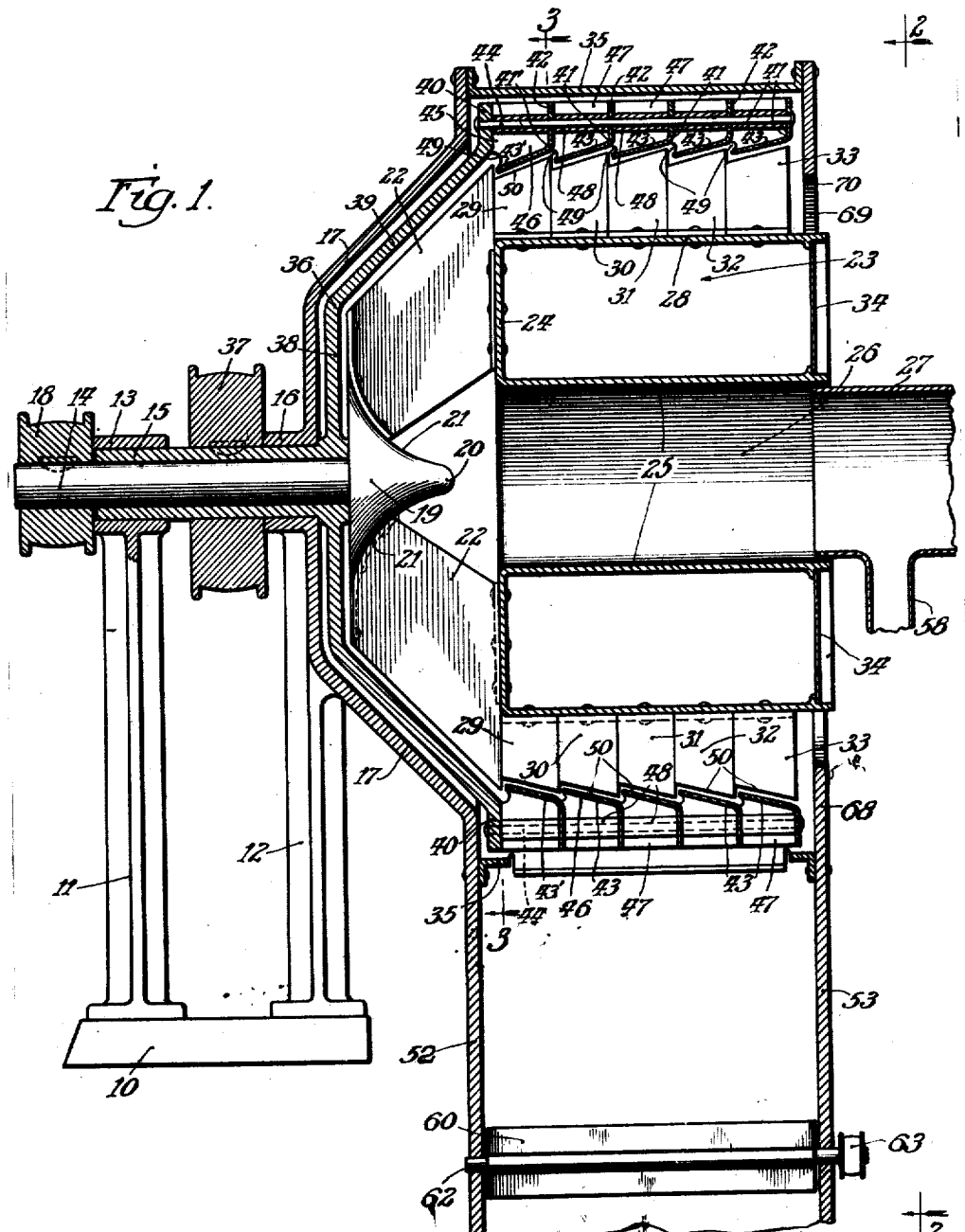
Fig. 1 is a longitudinal sectional view of my improved dust collecting device.

Referring in detail to the drawings, the improved dust collector is shown as being provided with a base 10 having the standards 11 and 12 thereon, said standard 11 being provided with a bearing 13 for the shaft 14 and the sleeve 15 which surrounds said shaft 14. The member 12 is also provided with the bearing portion at 16 and with a casing 17 which is bell-shaped and extends upwardly and downwardly from the bearing portion 16. Mounted on one end of the shaft 14 is a pulley 18. The other end of the shaft 14 is provided with an agitating member 19 which is provided with a central projection 20 having the curved faces 21 so as to form an enlarged circular boss having concave side faces.

Figure 3:
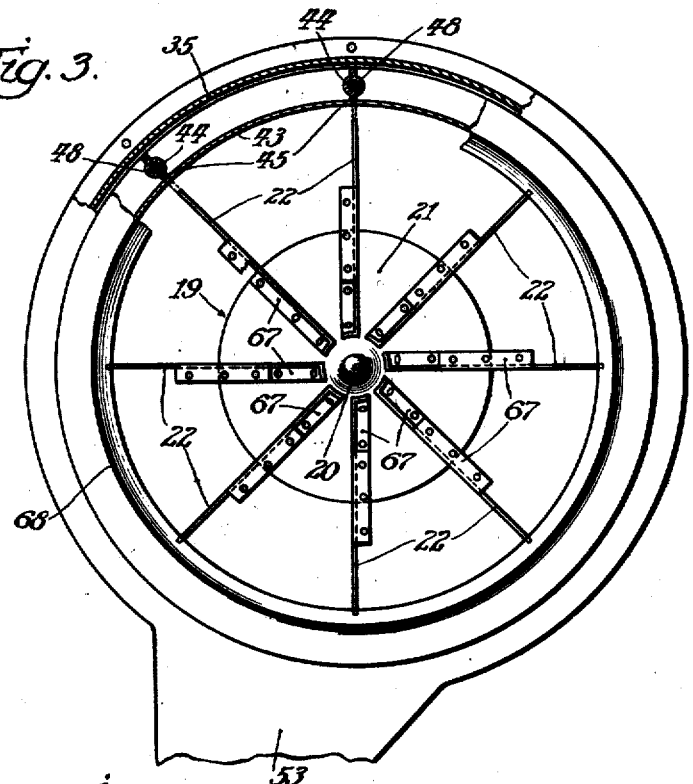
Fig. 3 is a section taken on the line 3—3 of Fig. 2.

Secured to said member 19 outwardly from the boss 20 and merging into the concave side faces 21 thereof is a plurality of blades 22. Preferably eight blades are used, but the number used may be varied in accordance with conditions. It will be seen that the blades 22 rotate with the shaft 14 and the inner drum 23 also rotates with this shaft due to the fact that the side face 24 thereof is riveted to the blades 22. The drum 23 is provided with a cylindrical inner face 25 providing a cylindrical passageway 26 leading from the inlet pipe 27 to the agitating member 19. The outer cylindrical wall portion 28 of the drum 23 is provided with a plurality of series of blades, said blades being arranged in rows around the face of the drum, and preferably each row comprises sixteen blades, although this number may be varied in accordance with conditions. The blades of the row adjacent the blades 22 are indicated by the numeral 29 and the succeeding rows of blades across the face of the drum from said row bearing the numeral 29 are designated by the numerals 30, 31, 32 and 33 respectively. The drum 23 is preferably closed by means of the plate 34 at the outer end thereof, while the bell-shaped member 17 is preferably provided with a curved channeled plate 35 which forms a casing together with the portion 17. The sleeve 15 is provided with a bell-shaped end portion 36 which may be made integral therewith if desired at one end thereof, and with a pulley 37. The member 36 has the radially extending wall portion 38 and the inclined wall portion 39 providing a conical face on the inner surface thereof. The member 36 is also provided with a radially extending flange or lip 40, and secured to said flange 40 are the annular members 41 and 41', which have the radially extending portions 42 and 42' respectively and the conical or inclined portions 43 and 43' respectively. The radial portions 42 and 42' are provided with openings through which the rods or bolts 44 extend. Mounted between the flange 40 and the member 42' and between the member 42' and each of the members 42 is a series of blades or scrapers 45, said scrapers being provided with inclined faces 46 to correspond to the outer faces of the portions 43 of the annular or ring-like members, and with straight faces 47 which are slightly spaced from the inner face of the curved channel member 35. Said members 45 are also each provided with a central enlargement 48 which is provided with a bore therethrough, as indicated in Fig. 3, through which the bolts 44 extend.

It will be seen that the members 45 serve to space the rings and also serve as scrapers to remove dust adhering to the inner face of the curved channel 35 therefrom. Preferably eight of the members 45 are provided in each row, although this number may be varied in accordance with conditions.

It will be noted that a space is provided between the inclined portion 39 of the member 36 and the inclined portion 43' of the member 41', and also that a space is provided between the member 41' and the adjacent member 41 and between all the members 41, but that the spacing between the members 41 and the member 41', which are similar in construction, is less than the spacing between the member 39 and the portion 43' of the member 41. The members 45 are slightly cut away as indicated at 49 in said openings so as to prevent any clogging of the same. The members 29 are provided with inclined outer edges 50 corresponding substantially in shape to the inclined surfaces of the members 41 and 41', a slight clearance being provided between the outer inclined edge of the blades and the inclined surfaces of the members 41 and 41'. The pipe or conduit 27 leads from any desired machine from which the dust is to be collected and fits loosely within the duct 26 so that the same will not interfere with the rotation of the parts carried by the member 19 which includes the drum 23. The shell from which the curved casing 35 is made is slightly offset at the free edge thereof so as to provide a slit indicated by the numeral 51. The lower portion of the member 17 is provided with a downwardly extending portion 52 and a similar downwardly extending side portion 53 is secured to the opposite side of the member 35, said portions 52 and 53 together with the vertical wall portion 54 and the inclined wall portion 55, forming a dust collecting chamber 56 which receives the dust passing through the slit or opening 51. Said dust collecting chamber 56 is preferably provided with a depending partition or baffle wall 57 and with a return pipe 58 leading to the conduit 27.

It will be evident that by providing the baffle wall 57 new air that will enter through the opening 51 from the machine will have to pass around said baffle wall before it enters the return pipe 58 and into adjacency with the dust outlet 59 which is provided with the rotating closure member 60 serving as an air lock to prevent discharge of any of the air into the outlet tube 61. The air locking member 60 is provided with a shaft 62 which is provided with a pulley 63 on the end thereof for driving the same.

Figure 2:
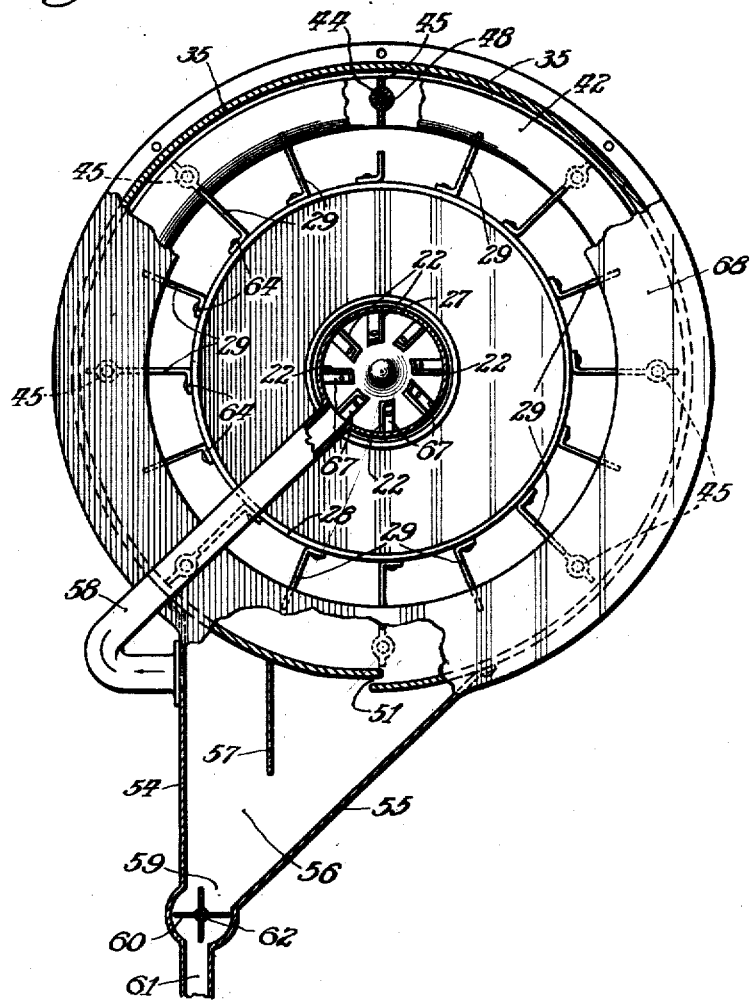
Fig. 2 is a view partly in section and partly in elevation taken on the line 2—2 of Fig. 1, parts of the device being shown as being broken away so as to better reveal the internal construction thereof.
Figure 4:
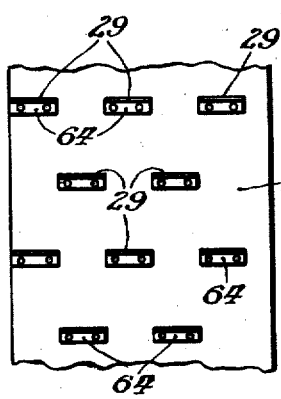
Fig. 4 is a development in a plane of a portion of the inner revolving member.
Figure 5:
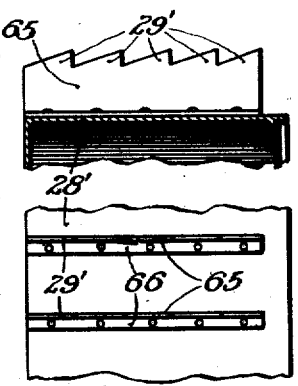
Fig. 5 is a fragmentary transverse sectional view of a modified form of inner drum.
Figure 6:
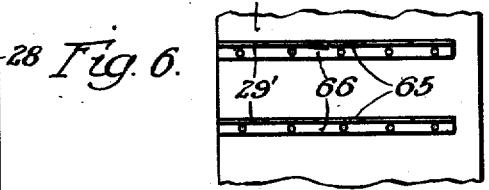
Fig. 6 is a section similar to Fig. 4 of the form shown in Fig. 5.

It will be seen upon reference to Figs. 2 and 4, that the members 29 are preferably arranged in staggered relationship, as will be clear from Fig. 4, and that said members are provided with flanges 64 by which the same are riveted to the outer face of the drum 28. However, in order to simplify the construction, if desired, instead of making the members 29 separate, a transversely extending blade 65 may be provided which has the saw tooth portions 29' corresponding to the blades 29 in Fig. 4, but of course, in this form the scraping members 29' will be in transverse alignment instead of staggered.

The members 65 are provided with flanges 66 for securing the same to the drum 28' in a similar manner to which the members 29 are secured to the drum 28. The members 22 are provided with flanges 67 which are adapted to be riveted to the curved outer face 21 of the member 9 for securing said members 22 in place. The member 53 is provided with a ring-like portion 68 which is secured to the channel member 35 around the entire outer edge thereof, said member extending to a point short of the outer face of the drum 28 so as to provide an opening 29 between the inner edge 70 thereof and the outer face of the drum 28.

In operation, the dust-laden air enters through the duct 27 into the circular chamber 26 which communicates with the space within the wall portion 17 in which the fan blades are located. As the blades 22 rotate with the shaft 14, and as this shaft is driven through the pulley 18 at about 1600 revolutions per minute, a strong current of air is set up which produces a suction that draws the dust-laden air from the duct 27 into the duct 26 and into the space where the fan blades are located. The member 19 is so shaped that the current of air striking the projection 20 thereon is divided, and is thrown in a radially outward direction against the inclined portion 39 of the member 36. Due to the action of the blades 22, the air is also driven transversely across the series of blades 29, 30, 31, 32 and 33, and as these are rotating at a high speed the dust-laden air is thrown outwardly against the inclined faces 43' and 43 of the members 41' and 41, thus the dust in the air tends to lodge on the inner faces of these members in a manner similar to that in which it lodges on the inner faces of pulleys that revolve at a rapid rate which are located in a room filled with dust. The blades 22 are located near the inner face of the inclined portion 39 and are provided with inclined outer edge portions that correspond to the inclination of the inner face of the member 39. The member 39 and the parts carried thereby revolve at a lower rate of speed than the members that are connected with the shaft 14, as the pulley 37 on the shaft 15 rotates at a speed of about only 400 revolutions per minute. Due to the fact that the member having the inclined face at 39 is revolving and due to the action of the blades 22, the dust that settles on the inner face of the portion 39 is gradually moved outwardly along the inclined surface until it passes out through the opening between the member 39 and the member 41'. Due to the fact that the parts connected with the member 36 are rotating at a speed of approximately 400 revolutions per minute, the dust passes outwardly into the space between the revolving parts and the stationary casing surrounding the same, and the dust therein is thrown against the outer drum or casing 35. In a similar manner the blades 29 cooperate with the inclined surface 43' of the member 41' which rotates at the same speed as the portion 39 to force the dust that collects on the inner face of the portion 43' outwardly along said surface and through the opening between the member 41' and the member 41 adjacent thereto. In a similar manner the blades 30 and the member 43 opposite this series of blades cooperate to collect and discharge the dust from the air that strikes the inclined surface 43, the air having dust therein passing successively into adjacency with the blades 31, 32 and 33 and operating in a similar manner to the blades 30 and 29. As a result, the amount of dust in the air is gradually reduced until by the time that the air reaches the opening 69 and is discharged from the device there is practically no dust remaining in the same. The dust that passes out between the adjoining members 43 or between the member 43' and the member 43 adjacent thereto, is also thrown against the inner face of the casing 35 by the action of the fan blades 45. The blades 45 also act as scrapers to remove the dust that sticks to the inner face of the member 35 therefrom. Clearance is provided between the inner face of the member 35 and the edges 47 of the members 45 as is evident from the drawings, although this is slightly exaggerated therein. The action of the scrapers is such as to gradually force the dust around the inner face of the member 35 in a clockwise direction in Fig. 2 until the same passes out through the slit at 51 into the space 56. As there is still a small amount of air mixed with the dust, a return pipe 58 has to be provided for returning some of the air to the dust collector, due to the fact that this air will, of course, still be laden with dust. The remainder of the dust passes out through the valve at 60. As the opening at 69 is much larger than the slit at 51 only about one-tenth of the air that passes through the machine passes through the slit 51, thus ninety per cent of the air that enters the machine is completely cleaned of dust.

It will be seen that due to the fact that all of the air that passes through the slits between the members 43, 43' and the member 39 has to pass through the slit 51, that a somewhat greater spacing can be provided between the members for providing said slits than where the slit acts to limit the air supply passing into the dust collection chamber, as would be the case if the casing 35 were not provided as described.

It will also be seen that due to the stepped arrangement of the plurality of inclined inner face members for collecting the dust the collecting capacity of the machine can be greatly varied and can be made of much more compact construction than if only one inclined face member were used, it being evident that the number of collecting rings used can be varied in accordance with the capacity of the machine, it being merely necessary to make the casing 35 wider for the purpose of increasing the capacity of the machine and adding the desired number of rings to get such a capacity that the air passing through the opening 69 will have substantially no dust therein.

Having thus described my invention, what I desire to claim and secure by U. S. Letters Patent is:

1. In a dust collector, a stationary casing, means for producing a current of air in said casing, a plurality of revolving members having conical inner wall portions within said casing, said members being spaced to provide gaps therebetween and means for dislodging dust from the wall of said stationary casing, said casing having a discharge opening in said wall and said means moving over said opening to force the dislodged dust therethrough.

2. In a dust collector, a stationary casing, means for producing a current of air in said casing, a plurality of revolving members having conical inner wall portions within said casing, said members being spaced to provide gaps therebetween and means for dislodging dust from said stationary casing, said means for producing said current of air rotating at a higher speed than said revolving members.

3. In a dust collector, a plurality of revolving members having inclined inner wall portions, said members being axially spaced from each other, and agitating means mounted for rotation within said members, said agitating means cooperating with said rotating members to push dust collected on said members through the spaces between said members.

4. In a dust collector, a plurality of revolving members having inclined inner wall portions, said members being axially spaced from each other and agitating means mounted for rotation within said members, said agitating means cooperating with said rotating members, to force dust collected on said members through the spaces between said members, said agitating means rotating at a higher rate of speed than said members.

5. In a dust collector, a plurality of revolving members having inclined inner wall portions, said members being axially spaced from each other and a plurality of blades mounted for rotation within said members and independently of said members and cooperating therewith to force dust collected thereon outwardly through the spaces between said members.

6. In a dust collector, a plurality of revolving members having inclined inner wall portions, said members being axially spaced from each other, agitating means mounted for rotation within said members, said agitating means cooperating with said rotating members to force dust collected on said members through the spaces between said members and positive means for driving said agitating means at a higher speed than said revolving members.

7. In a device of the character described, a casing, a plurality of rotating dust collecting members mounted within said casing, said members being axially spaced and having inclined dust collecting faces, and means within said dust collecting members rotating at a higher speed than said members, said means comprising a plurality of blades cooperating with said collecting members to move the dust along said inclined faces and through the spaces between said members.

8. In a device of the character described, a casing, a plurality of rotating dust collecting members mounted within said casing, said members being axially spaced and having inclined dust collecting faces, means within said dust collecting members rotating at a higher speed than said members, said means comprising a plurality of blades cooperating with said collecting members to move the dust along said inclined faces and through the spaces between said members, and means for dislodging dust from the inner face of said casing.

9. In a device of the character described, an outer chamber having fixed walls, an inner chamber having rotating walls, a duct leading into said inner chamber and agitating means within said inner chamber for drawing dust-laden air into the same, said inner chamber being provided with means forming an end wall thereof for deflecting the dust-laden air toward the outer side thereof.

10. In a device of the character described, an outer chamber having fixed walls, an inner chamber having rotating walls, certain portions of said walls being inclined to the axis of rotation, a duct leading into said inner chamber and agitating means within said inner chamber for drawing dust-laden air into the same, said inner chamber being provided with means forming an end wall thereof for deflecting the dust-laden air against said inclined portions.

11. In a dust collector, an outer casing, a member mounted for rotation within said casing, said member being provided with a plurality of inclined wall portions, said wall portions being axially spaced to provide slits therebetween, and an agitating device mounted for independent rotation with said member, said agitating device comprising a plurality of blades conforming to the inner faces of said wall portions.

12. In a dust collector, an outer casing, a member mounted for rotation within said casing, said member being provided with a plurality of inclined wall portions, said wall portions being axially spaced to provide slits therebetween, and an agitating device mounted for independent rotation within said member, said agitating device comprising a plurality of fan blades and a drum secured thereto, said drum being provided with a plurality of blades on the outer surface thereof.

13. In a dust collector, an outer casing, a member mounted for rotation within said casing, said member being provided with a plurality of inclined wall portions, said wall portions being axially spaced to provide slits therebetween, and an agitating device mounted for independent rotation within said member, said agitating device comprising a plurality of fan blades and a drum secured thereto, said drum having a central opening providing an intake duct for said dust collector.

14. In a dust collector, an outer casing, a member mounted for rotation within said casing, said member being provided with a plurality of inclined wall portions, said wall portions being axially spaced to provide slits therebetween, and an agitating device mounted for independent rotation within said member, said agitating device comprising a plurality of fan blades and a drum secured thereto, said drum having a central opening providing an intake duct for said dust collector, and means for deflecting the dust-laden air from said intake duct toward the inner faces of said inclined portions.

15. In a dust collector, an outer casing, a member mounted for rotation within said casing, said member being provided with a plurality of inclined wall portions, said wall portions being axially spaced to provide slits therebetween, and an agitating device mounted for independent rotation with said member, said agitating device comprising a plurality of blades conforming to the inner faces of said wall portions, said blades conforming to the inner faces of said inclined wall portions, and being adapted to cooperate therewith to move the dust collected on said faces outwardly toward said slits.

16. In a dust collector, a casing, a dust collecting bell mounted to rotate in said casing having a conical wall portion, a plurality of dust collecting rings mounted to rotate with said bell, said rings being provided with inclined wall portions forming stepped continuations of the inner wall of said bell, and an agitating device within said bell and rings.

17. In a dust collector, a casing, a dust collecting bell mounted to rotate in said casing having a conical wall portion, a plurality of dust collecting rings mounted to rotate with said bell, said rings being provided with wall portions inclined to correspond with the conical wall of said bell, said rings being axially spaced from said bell and from each other to provide slits therebetween, and an agitating device within said bell and rings.

18. In a dust collector, a casing, a dust collecting bell mounted to rotate in said casing having a conical wall portion and a radially extending flange, a plurality of dust collecting rings secured to said flange, means for spacing said rings to provide slits therebetween, and an agitating device within said bell and rings.

19. In a dust collector, a casing, a dust collecting bell mounted to rotate in said casing, having a conical wall portion and a radially extending flange, a plurality of dust collecting rings secured to said flange, means for spacing said rings to provide slits therebetween, said rings having inclined wall portions and radially extending portions, and an agitating device within said bell and rings.

20. In a dust collector, a casing, a dust collecting bell mounted to rotate in said casing, having a conical wall portion and a radially extending flange, a plurality of dust collecting rings secured to said flange, means for spacing said rings to provide slits therebetween, said rings having inclined wall portions and radially extending portions, blades for dislodging dust from said casing mounted to rotate with said rings, and an agitating device within said bell and rings.

21. In a dust collector, a casing, a dust collecting bell mounted to rotate in said casing, having a conical wall portion, a plurality of dust collecting rings mounted to rotate with said bell, said rings being spaced from said bell and from each other to provide slits therebetween, said rings being provided with inclined wall portions, and an agitating device within said bell and rings, the space between said bell and the first of said rings being greater than the spaces between said rings.

22. A device of the character described comprising an outer casing having a transverse opening therein, a plurality of rotating spaced dust collecting members within said casing, a dust chamber below said opening, a fan for throwing the dust-laden air within said dust collecting members against the inner faces thereof, and means rotating with said members for moving the dust collected in said casing through said opening.

23. In a dust collector, a plurality of revolving members having inclined inner wall portions, said members being axially spaced from each other and a plurality of blades having inclined outer ends mounted for rotation within said members and cooperating therewith to force dust collected thereon outwardly through the spaces between said members.

24. In a dust collector, a casing, a dust collecting bell mounted to rotate in said casing having a conical wall portion, a plurality of dust collecting rings mounted to rotate with said bell, said rings being provided with inclined wall portions forming continuations of the wall portion of said bell, and an agitating device within said bell and rings.

25. A device of the character described comprising an outer casing having a transverse opening therein, a plurality of rotating spaced dust collecting members within said casing, a dust chamber below said opening, a fan for throwing the dust laden air within said dust collecting members against the inner faces thereof, and means rotating with said members for moving the dust collected in said casing through said opening, said device having a return duct leading from said dust chamber to the intake of said device.

26. In a dust collector, a stationary casing having a substantially cylindrical wall portion, means for producing a current of air in said casing, a plurality of revolving members having conical inner wall portions within said casing, said members being spaced to provide gaps therebetween, and means for dislodging dust from said wall portion of said stationary casing.

In witness whereof, I hereunto subscribe my name this 16th day of May A. D., 1922.

LESTER L. LADD.